United States Patent
Yasui (10) Patent No.: US 9,994,204 B2
(45) Date of Patent: Jun. 12, 2018

(54) VEHICULAR BRAKE SYSTEM

(71) Applicant: NTN CORPORATION, Osaka (JP)

(72) Inventor: Makoto Yasui, Iwata (JP)

(73) Assignee: NTN CORPORATION, Osaka (JP)

( * ) Notice: Subject to any disclaimer, the term of this patent is extended or adjusted under 35 U.S.C. 154(b) by 10 days.

(21) Appl. No.: 15/188,044

(22) Filed: Jun. 21, 2016

(65) Prior Publication Data

US 2016/0297414 A1 Oct. 13, 2016

Related U.S. Application Data

(63) Continuation of application No. PCT/JP2014/083196, filed on Dec. 16, 2014.

(30) Foreign Application Priority Data

Dec. 24, 2013 (JP) .................. 2013-265140

(51) Int. Cl.
*B60T 13/58* (2006.01)
*B60T 8/26* (2006.01)
(Continued)

(52) U.S. Cl.
CPC ............ *B60T 13/588* (2013.01); *B60T 8/171* (2013.01); *B60T 8/267* (2013.01); *B60T 13/741* (2013.01);
(Continued)

(58) Field of Classification Search
CPC ...... B60T 8/267; B60T 13/588; B60T 13/741; B60T 8/171; F16D 65/18; F16D 65/183;
(Continued)

(56) References Cited

U.S. PATENT DOCUMENTS 6,267,454 B1    7/2001  Takahashi
6,270,172 B1 *  8/2001  Shirai ................ B60T 7/042
                                                         303/112
(Continued)

FOREIGN PATENT DOCUMENTS

CN        101519064 A       9/2009
JP        11-334575         12/1999
(Continued)

OTHER PUBLICATIONS

Extended European Search Report dated Jul. 18, 2017 in corresponding European Patent Application No. 14875168.8.
(Continued)

*Primary Examiner* — Thomas J Williams
*Assistant Examiner* — Mariano Sy (57) ABSTRACT

The vehicular brake system includes a hydraulic brake device and an electromechanical brake device. The electromechanical brake device includes: an electric motor; a braking force application mechanism to apply, to wheels, a braking force having a value based on an output from the electric motor; and a control device to control the electric motor. A brake operation input detector to detect an input of a brake operation is provided. The control device includes: determination section to determine whether a vehicle speed detected by vehicle speed detector is less than or equal to a predetermined vehicle speed; and operation limiter to limit or halt an output from the electric motor even when the brake operation input detector detects an input of a brake operation in a case where the determination section determines that the vehicle speed is less than or equal to the predetermined vehicle speed.

6 Claims, 5 Drawing Sheets

(51) Int. Cl.
  *B60T 13/74* (2006.01)
  *F16D 65/18* (2006.01)
  *B60T 8/171* (2006.01)
  *F16D 121/24* (2012.01)
  *F16D 125/40* (2012.01)
  *F16D 121/04* (2012.01)
  *F16D 123/00* (2012.01)

(52) U.S. Cl.
  CPC ........... *F16D 65/18* (2013.01); *F16D 65/183* (2013.01); *F16D 2121/04* (2013.01); *F16D 2121/24* (2013.01); *F16D 2123/00* (2013.01); *F16D 2125/40* (2013.01)

(58) Field of Classification Search
  CPC ............. F16D 2125/40; F16D 2121/04; F16D 2123/00; F16D 2121/24
  USPC .......................................................... 303/151
  See application file for complete search history.

(56) References Cited

U.S. PATENT DOCUMENTS

| | | | | |
|---|---|---|---|---|
| 6,283,239 | B1* | 9/2001 | Tsukamoto | ............... B60K 6/48 180/65.25 |
| 6,394,235 | B1 | 5/2002 | Poertzgen et al. | |
| 6,726,592 | B2* | 4/2004 | Kotani | ................... B60K 6/365 475/2 |
| 6,959,971 | B2 | 11/2005 | Tsunehara | |
| 8,556,353 | B2 | 10/2013 | Ishii et al. | |
| 2002/0026272 | A1* | 2/2002 | Yamamoto | ............ B60T 8/3255 701/70 |
| 2004/0090116 | A1 | 5/2004 | Tsunehara | |
| 2004/0108771 | A1* | 6/2004 | Tsunehara | ................. B60L 7/22 303/155 |
| 2008/0048596 | A1* | 2/2008 | Konishi | .................. B60T 7/042 318/372 |
| 2008/0133098 | A1 | 6/2008 | Wang et al. | |
| 2008/0236964 | A1* | 10/2008 | Kikuchi | ................ B60T 13/741 188/162 |
| 2008/0283347 | A1 | 11/2008 | Cao et al. | |
| 2009/0082935 | A1 | 3/2009 | Leschuk et al. | |
| 2009/0256417 | A1* | 10/2009 | Ishii | ....................... B60T 8/267 303/152 |
| 2010/0250081 | A1* | 9/2010 | Kinser | ..................... B60T 8/00 701/70 |
| 2011/0039658 | A1 | 2/2011 | Sokoll | |
| 2013/0169032 | A1 | 7/2013 | Linhoff | |
| 2015/0360656 | A1 | 12/2015 | Masuda | |

FOREIGN PATENT DOCUMENTS

| | | |
|---|---|---|
| JP | 2001-510760 | 8/2001 |
| JP | 2004-155390 | 6/2004 |
| JP | 2006-231954 | 9/2006 |
| JP | 3927357 | 3/2007 |
| JP | 2014-133429 | 7/2014 |
| WO | WO 99/05011 | 2/1999 |
| WO | WO 2007/014952 A1 | 2/2007 |

OTHER PUBLICATIONS

International Search Report dated Mar. 31, 2015, in corresponding International Application No. PCT/JP2014/083196.
International Preliminary Report on Patentability dated Jul. 7, 2016 in corresponding International Patent Application No. PCT/JP2014/083196.
Japanese Notification of Reason(s) for Rejection dated Oct. 10, 2017 in corresponding Japanese Patent Application No. 2013-265140.
Office Action dated Feb. 24, 2018, in corresponding Chinese Patent Application No. 201480070302.4, 13 pgs.

* cited by examiner

EXAMPLE OF LIMITATION CONTROL (1) REDUCTION OF RATE

EXAMPLE OF LIMITATION CONTROL (2) UPPER LIMIT CUT

Fig. 8

EXAMPLE OF LIMITATION CONTROL (3) PROHIBITION OF OPERATION

VEHICULAR BRAKE SYSTEM

CROSS REFERENCE TO THE RELATED APPLICATION

This application is a continuation application, under 35 U.S.C. § 111(a), of international application No. PCT/JP2014/083196, filed Dec. 16, 2014, which is based on and claims Convention priority to Japanese patent application No. 2013-265140, filed Dec. 24, 2013, the entire disclosure of which is herein incorporated by reference as a part of this application.

BACKGROUND OF THE INVENTION (Field of the Invention)
The present invention relates to a vehicular brake system, and to a technique of reducing an operating noise of an electromechanical brake device of a vehicle having a hydraulic brake device and the electromechanical brake device mounted therein when the vehicle runs slowly at a reduced speed or is halted.

(Description of Related Art)
To date, as a vehicular brake system that applies a braking force to wheels to brake the vehicle, a device in which both an oil pressure brake and an electromechanical brake are used, has been known (Patent Documents 1 and 2). A control method for reducing power consumption of an electromechanical brake has been suggested (Patent Documents 3 and 4). A caliper of the above electromechanical brake typically has an electromechanical actuator that includes a motor, a speed reducer or reduction gear, and a linear motion mechanism.

RELATED DOCUMENT

Patent Document

[Patent Document 1] JP Patent No. 3927357
[Patent Document 2] JP Laid-open Patent Publication No. 2004-155390
[Patent Document 3] JP Laid-open Patent Publication No. 2006-231954
[Patent Document 4] JP Laid-open Patent Publication No. 2014-133429

In a typical electromechanical brake, a brake pad is pressed against a disc rotor by a linear motion mechanism through a speed reducer by using a motor. In general, a gear mechanism is used for the speed reducer. In this case, the faster a brake pedal is operated, that is, the faster the motor is rotated, the louder an operating noise such as gear rattle caused by backlash of the gears becomes. While the vehicle is running, a noise of the electromechanical brake is not noticeable due to influence of noise of other operating components, such as an engine, of the vehicle, tire noise, wind noise of the vehicle, or the like.

Meanwhile, in a case where an electromechanical brake is actuated when the vehicle runs slowly at a reduced speed or is halted, the ambient noises as described above are reduced, and an operating noise of the electromechanical brake thus becomes noticeable. When the vehicle runs slowly at a reduced speed or is halted, a problem arises that the noise is unpleasant to not only a driver in the vehicle but also pedestrians outside the vehicle. Further, even when the vehicle is halted, or parked with a parking brake operated, a driver may step on a brake pedal inadvertently or unconsciously, to change a pedaling force although the driver does not intend to brake the vehicle. In contrast, noise is rarely generated by the current hydraulic brakes.

SUMMARY OF THE INVENTION

An object of the present invention is to provide a vehicular brake system capable of reducing an operating noise particularly when a vehicle runs at a low speed or is halted and thus an operating noise of an electromechanical brake is likely to become noticeable.

Hereinafter, in order to facilitate the understanding, the present invention will be described with reference to the reference numerals used in embodiments for convenience sake.

A vehicular brake system of the present invention includes: a hydraulic brake device A1, A1 used for left and right front wheels 45, 45, 43, 43 of one of front and rear wheel sets and being configured to apply a braking force by a working fluid pressure to the left and right wheels of the one of the wheel sets, according to a brake operation; and an electromechanical brake device A2, A2 used for left and right wheels 45, 45, 43, 43 of the other of the wheel sets and being configured to apply a braking force by an electric power to the left and right wheels of the other of the wheel sets, according to the brake operation. The electromechanical brake device A2 includes: an electric motor 2; a braking force application mechanism 42 configured to apply, to the wheels, the braking force having a value based on an output from the electric motor 2; and a control device 9 configured to control the electric motor 2. A brake operation input detector 31a configured to detect an input of the brake operation from a driver is provided in the vehicular brake system. The control device 9 includes: a determination section 41 configured to determine whether or not a vehicle speed detected by a vehicle speed detector 44 is less than or equal to a predetermined vehicle speed; and an operation limiter 49 configured to limit or halt an output from the electric motor 2 even when the brake operation input detector 31a detects the input of the brake operation, in a case where the determination section 41 determines that the vehicle speed is less than or equal to the predetermined vehicle speed. The "less than or equal to a predetermined vehicle speed" described above, is defined by a test, simulation, or the like, and is set as, for example, less than or equal to a reduced speed at which the vehicle runs slowly, or a speed corresponding to a halted state. The "limit an output from the electric motor 2" described above means limiting an output from the electric motor 2 by inputting, to the electric motor 2, a current lower than a current to be inputted to the electric motor 2 in the case that the vehicle speed is higher than the predetermined vehicle speed (in a normal state).

In this configuration, the determination section 41 constantly determines whether or not a vehicle speed detected by the vehicle speed detector 44 is less than or equal to the predetermined vehicle speed. In the case where the determination section 41 determines that the vehicle speed is less than or equal to the predetermined vehicle speed, even when the input of the brake operation is detected by the brake operation input detector 31a, the operation limiter 49 limits or halts the output from the electric motor 2. In this case, braking is performed mainly by the hydraulic brake devices A1, A1 applying a braking force by a working fluid pressure to the left and right wheels of the one of the front and rear wheel sets. When the vehicle runs slowly at a reduced speed or is halted (or at stoppage), the braking force can be sufficiently assured by the left and right wheels of only one of the wheel sets. Thus, in a vehicle in which both the hydraulic brake device A1 and the electromechanical brake device A2 are used, when the vehicle runs at a low speed or is halted and thus an operating noise of the electromechanical brake device A2 becomes noticeable, an operation itself is limited, whereby the operating noise can be reduced with little influence on a braking force of the brake.

The braking force application mechanism 42 may include: a speed reduction mechanism 3 configured to reduce a speed of rotation of the electric motor 2; and a linear motion mechanism 4 configured to convert, into a linear motion, a rotary motion outputted from the speed reduction mechanism 3. In this case, the electric motor 2 is rotated according to a brake operation performed by a driver, and the speed reduction mechanism 3 reduces a speed of rotation of the electric motor 2. The linear motion mechanism 4 converts, into the linear motion, the rotary motion outputted from the speed reduction mechanism 3 and brings a pressing member 7 into contact with the brake rotor 6 or separates the pressing member 7 from the brake rotor 6. When the vehicle speed is less than or equal to the predetermined vehicle speed, the operation limiter 49 limits an operation of the electromechanical brake device A2, whereby an operating noise caused by a backlash of the speed reduction mechanism 3 can be reduced.

The vehicle speed detector 44 may be a sensor that includes at least one of a rotation sensor, an acceleration sensor, and a global positioning system sensor, the rotation sensor being configured to detect a rotation of the wheel or a rotation of a rotary mechanism including a motor that cooperates with the wheels and any rotatable unit disposed between the motor and the wheels.

When the determination section 41 determines that the vehicle speed is less than or equal to the predetermined vehicle speed, the operation limiter 49 may reduce a current to be inputted to the electric motor 2 at a predetermined rate as compared with a current inputted to the electric motor 2 in a normal state, with respect to the input of the brake operation detected by the brake operation input detector 31a. The "normal state" represents a state where the vehicle speed is higher than the predetermined vehicle speed and an operation of the electric motor is not limited. The predetermined rate is defined by a test, simulation, or the like, and is set to, for example, such a rate as to reduce an operating noise of the speed reduction mechanism 3 or the like, and to assure a necessary and sufficient braking force by the hydraulic brake device A1. In this case, when the vehicle speed is less than or equal to the predetermined vehicle speed, a ratio between a braking force by the hydraulic brake device A1 and a braking force by the electromechanical brake device A2 can be finely adjusted according to the brake operation. Therefore, a driver can be prevented from feeling uncomfortable about an operation when the driver operates the brake.

When the determination section 41 determines that the vehicle speed is less than or equal to the predetermined vehicle speed, the operation limiter 49 may limit a motor output from the electric motor 2 such that the motor output does not exceed a predetermined value. The "predetermined value" is defined by a test by an actual vehicle, simulation, or the like. In this case, when the vehicle runs slowly at a reduced speed, or is halted, an operating noise of the electromechanical brake device A2 can be more assuredly reduced.

When the determination section 41 determines that the vehicle speed is less than or equal to the predetermined vehicle speed, the operation limiter 49 may set a motor output from the electric motor 2 to be zero. In this case, the left and right wheels of the one of the front and rear wheel sets can be braked only by the hydraulic brake device A1, and a load for calculation process of the control device 9 can be reduced.

The hydraulic brake device A1 may perform a normal operation based on an operation of a brake pedal 32. The hydraulic brake device A1 may operate so as to enhance a braking force by an amount corresponding to a limited or reduced amount of a braking force by the electromechanical brake device A2. Thus, even when the electromechanical brake device A2 is regulated, an operation of the hydraulic brake device A1 is enhanced by an amount corresponding to the limited or reduced amount, whereby the braking force can be maintained in total.

Any combination of at least two constructions, disclosed in the appended claims and/or the specification and/or the accompanying drawings should be construed as included within the scope of the present invention. In particular, any combination of two or more of the appended claims should be equally construed as included within the scope of the present invention.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views.

DESCRIPTION OF EMBODIMENTS

Figure 1:
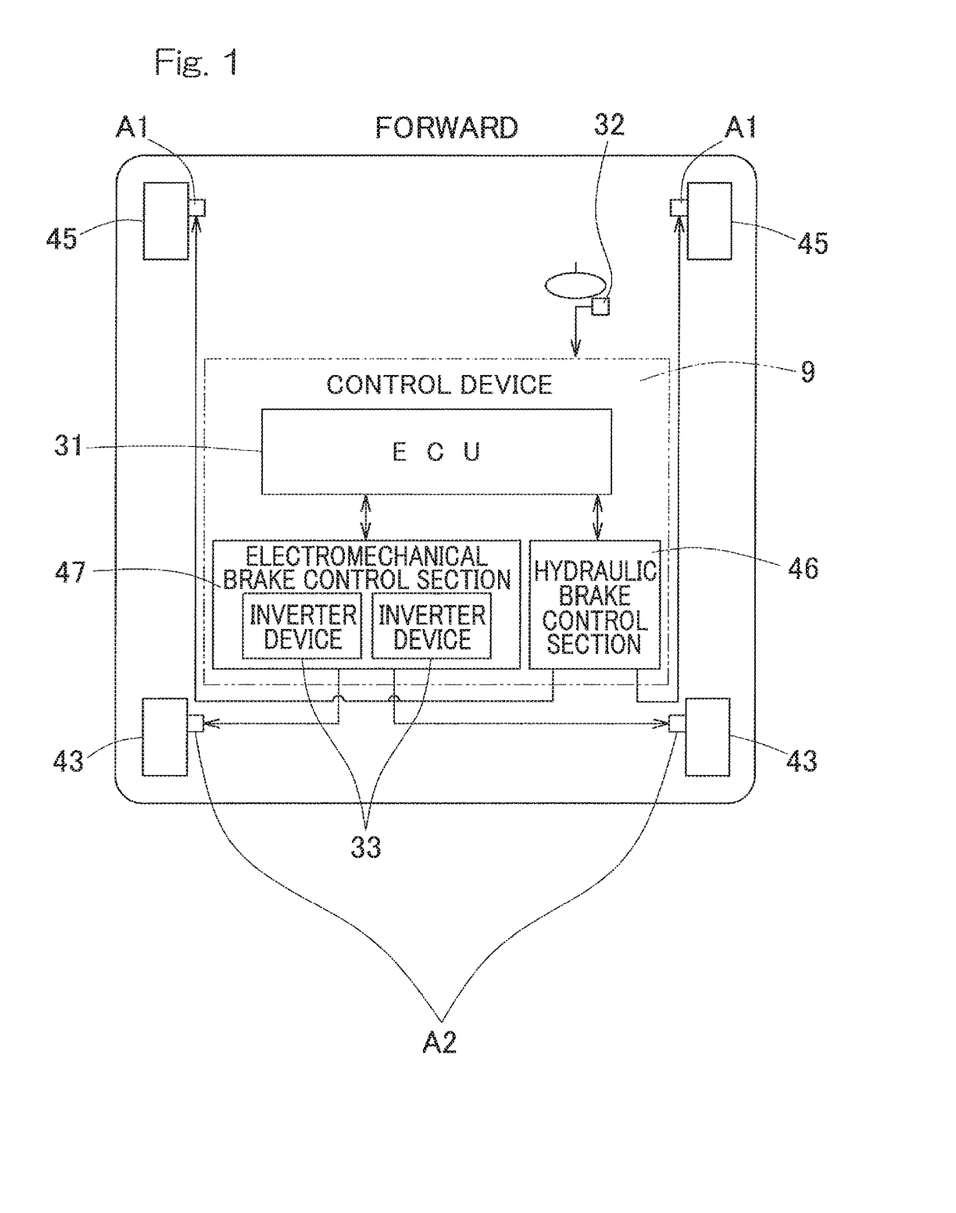
FIG. 1 schematically illustrates a configuration of a vehicular brake system according to a first embodiment of the present invention.

A vehicular brake system according to a first embodiment of the present invention will be described with reference to FIGS. 1 to 6. The following description includes description for a method for controlling the vehicular brake system. As shown in FIG. 1, the vehicular brake system includes: hydraulic brake devices A1, A1 that apply respective braking forces to left and right front wheels 45, 45, that is a front wheel set, of the vehicle; electromechanical brake devices A2, A2 that apply respective braking forces to left and right rear wheels 43, 43, that is a rear wheel set; and a control device 9 that controls the brake devices A1, A2.

A vehicle having the vehicular brake system mounted therein has an ECU 31 that is an electric control unit. The control device 9 has the ECU 31 that is higher-order control unit, a hydraulic brake control section 46, and an electromechanical brake control section 47. The hydraulic brake control section 46 generates an oil pressure in a not-illustrated master cylinder according to or in response to an operation of a brake pedal 32, and the oil pressure is supplied to each of not-illustrated wheel cylinders, whereby the braking force is applied to the left and right front wheels 45, 45 or the front wheel set in the present embodiment. An oil pressure sensor 48 (FIG. 4) for detecting the oil pressure generated in the master cylinder may be provided and used for controlling the electromechanical brake devices A2 described below.

Figure 2:
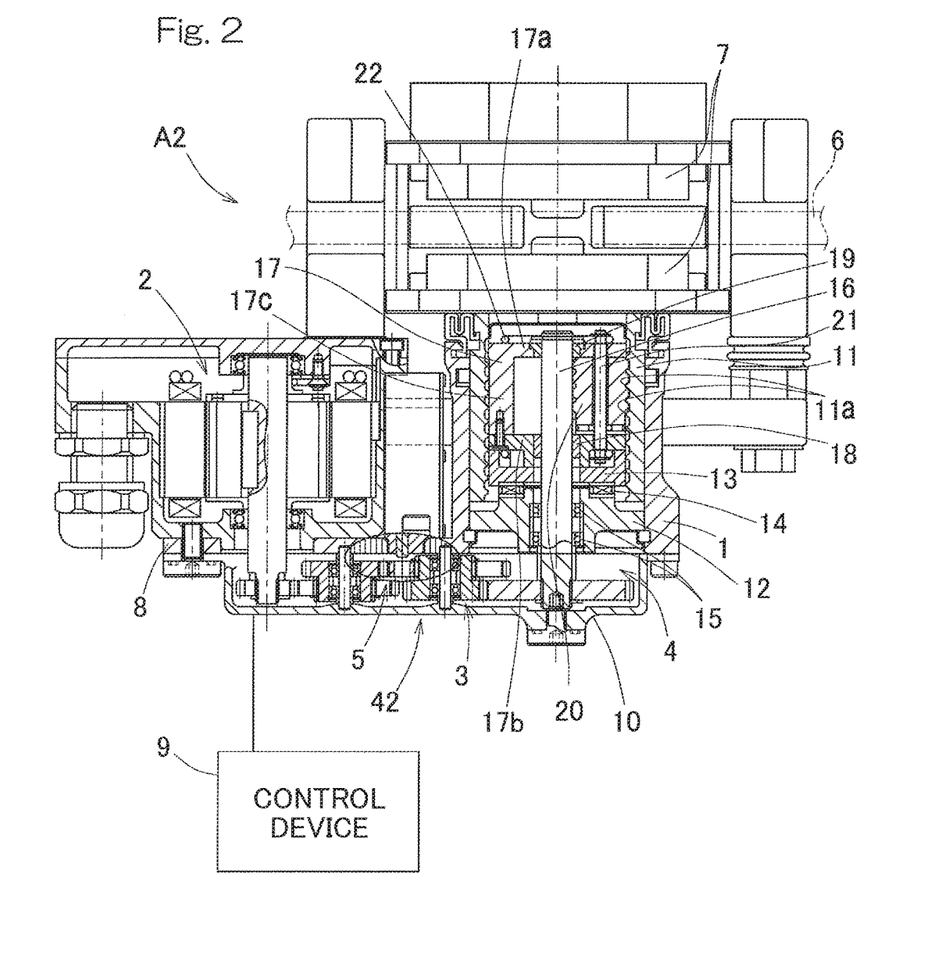
FIG. 2 is a cross-sectional view of an electromechanical brake device of the vehicular brake system.

The electromechanical brake control section 47 has inverter devices 33, 33 for converting, according to a speed reduction command as a torque command provided by the ECU 31, the command into a current command, and individually controlling electric motors 2 (FIG. 2) of the electromechanical brake devices A2, A2, respectively. As shown in FIG. 2, each electromechanical brake device A2 has: a housing 1; the electric motor 2; a braking force application mechanism 42 for applying, to the wheel, a braking force having a value based on an output from the electric motor 2; and the control device 9 for controlling the electric motor 2. The braking force application mechanism 42 has: a speed reduction mechanism 3 for reducing a speed of rotation of the electric motor 2; a linear motion mechanism 4; a locking mechanism 5; a brake rotor 6; and a brake pad 7.

A base plate 8 is provided at an opening end of the housing 1 so as to extend radially outward, and the electric motor 2 is supported by the base plate 8. The linear motion mechanism 4 is incorporated into the housing 1 so as to apply a braking force to the brake rotor 6, in this example, to a disc rotor 6 by the output from the electric motor 2. The opening end of the housing 1 and an outer side surface of the base plate 8 are covered by a cover 10.

The linear motion mechanism 4 will be described. The linear motion mechanism 4 is a mechanism that converts a rotary motion outputted from the speed reduction mechanism 3 into a linear motion to bring the brake pad 7 into contact with the brake rotor 6 or to separate the brake pad 7 from the brake rotor 6. The linear motion mechanism 4 includes a slide member 11, a bearing member 12, an annular thrust plate 13, a thrust bearing 14, rolling bearings 15, 15, a rotation shaft 16, a carrier 17, and slide bearings 18, 19. The slide member 11 having a cylindrical shape is supported on the inner circumferential surface of the housing 1 such that the slide member 11 is prevented from rotating and is movable in an axial direction of the rotation shaft 16. On the inner circumferential surface of the slide member 11, a helical projection 11a is helically formed so as to project by a predetermined distance in the radially inward direction. A plurality of planetary rollers 20 described below mesh with the helical projection 11a.

The bearing member 12 is provided at one end side, in the axial direction, of the slide member 11 in the housing 1. The bearing member 12 includes: a flange portion that extends radially outward; and a boss portion. The rolling bearings 15, 15 are fitted to an inner periphery of the boss portion, and the rotation shaft 16 is fitted to the inner diameter surface of an inner ring of each of the bearings 15, 15. Therefore, the rotation shaft 16 is rotatably supported by the bearing member 12 through the bearings 15, 15.

The carrier 17 is provided on the inner circumference of the slide member 11 so as to be rotatable about the rotation shaft 16. The carrier 17 has disks 17a and 17b that oppose to each other in the axial direction. The disk 17b on the bearing member 12 side may be referred to as an inner disk 17b, and the disk 17a may be referred to as an outer disk 17a. A distance adjustment member 17c which projects in the axial direction from the outer circumferential edge portion of the side surface is provided, in the disk 17a that is one of the disks, on the side surface opposing to the disk 17b that is the other of the disks. A plurality of the distance adjustment members 17c are arranged so as to be spaced from each other in the circumferential direction such that distances between the plurality of planetary rollers 20 are adjusted. Both the disks 17a and 17b are integrated with each other with the distance adjustment members 17c.

The inner disk 17b is supported by the slide bearing 18 that is fitted between the inner disk 17b and the rotation shaft 16 so as to be rotatable. The outer disk 17a has a shaft insertion hole formed at the center thereof and the slide bearing 19 is fitted into the shaft insertion hole. The outer disk 17a is rotatably supported by the slide bearing 19 to the rotation shaft 16. A washer for receiving a thrust load is fitted to the end portion of the rotation shaft 16, and a retaining ring that prevents the washer from being removed is provided.

The carrier 17 has a plurality of roller shafts 21 spaced from each other in the circumferential direction. Both end portions of each roller shaft 21 are supported by the disks 17a and 17b. That is, each of the disks 17a and 17b has a plurality of shaft insertion holes that are formed as long holes, and both the end portions of each roller shaft 21 are inserted into the corresponding shaft insertion holes, whereby the roller shafts 21 are supported so as to be movable in the radial direction. An elastic ring 22 is provided around each of the plurality of roller shafts 21 so as to bias the roller shafts 21 in the radially inward direction.

The planetary rollers 20 are rotatably supported by the roller shafts 21, respectively, and each planetary roller 20 is disposed between the outer circumferential surface of the rotation shaft 16 and the inner circumferential surface of the slide member 11. Each planetary roller 20 is pressed against the outer circumferential surface of the rotation shaft 16 by a bias force of the elastic ring 22 provided around each of the plurality of roller shafts 21. By rotation of the rotation shaft 16, each planetary roller 20 that is in contact with the outer circumferential surface of the rotation shaft 16 rotates due to contact friction therebetween. On the outer circumferential surface of each planetary roller 20, a helical groove is formed so as to mesh with the helical projection 11a of the slide member 11.

A washer and a thrust bearing are disposed between the inner disk 17b of the carrier 17 and one end portion, in the axial direction, of each planetary roller 20. In the housing 1, the annular thrust plate 13 and the thrust bearing 14 are disposed between the inner disk 17b and the bearing member 12.

Figure 3:
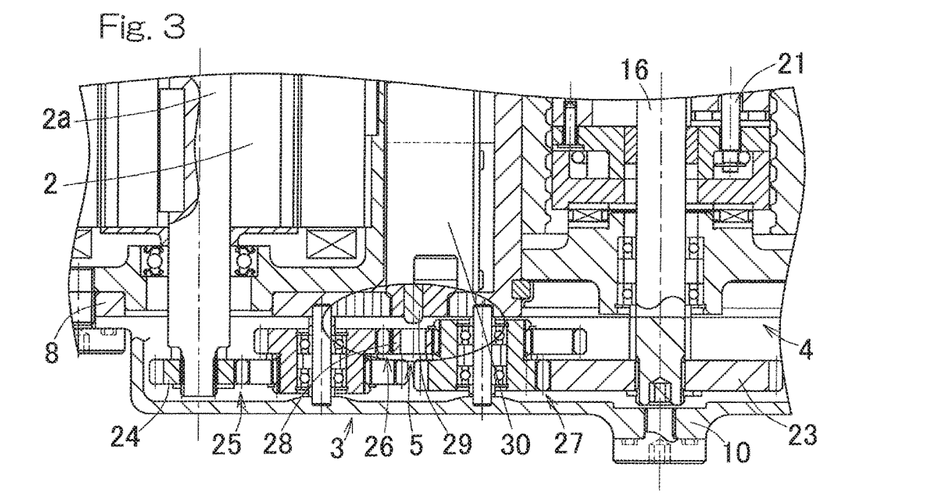
FIG. 3 is an enlarged cross-sectional view of a portion around a speed reduction mechanism of the electromechanical brake device.

The speed reduction mechanism 3 will be described. As shown in FIG. 3, the speed reduction mechanism 3 is a mechanism that reduces a speed of rotation of the electric motor 2 and transmits the rotation to an output gear 23 fixed to the rotation shaft 16, and the speed reduction mechanism 3 includes a plurality of gear trains. In this example, the speed reduction mechanism 3 sequentially reduces, by gear trains 25, 26, and 27, a speed of rotation of an input gear 24 mounted to a rotor shaft 2a of the electric motor 2, and allows the rotation to be transmitted to the output gear 23 fixed to the end portion of the rotation shaft 16.

The locking mechanism 5 will be described. The locking mechanism 5 is configured to switch between: a locking state in which a braking force reducing operation of the linear motion mechanism 4 is inhibited; and an unlocking state in which the braking force reducing operation is allowed. The locking mechanism 5 is provided in the speed reduction mechanism 3. The locking mechanism 5 has: a casing (not shown); a lock pin 29; a biasing member (not shown) that biases the lock pin 29 so as to be in the unlocking state; and a linear solenoid 30 that acts as an actuator for driving switching of the lock pin 29. The casing is supported by the base plate 8, and the base plate 8 has a pin hole through which the lock pin 29 is allowed to move forward and backward.

The locking state is obtained when the lock pin 29 is moved forward by the linear solenoid 30, and engaged into a locking hole formed in an intermediate gear 28 on the output side of the gear train 26, to prevent a rotation of the intermediate gear 28. By the linear solenoid 30 being made off, the lock pin 29 is stored in the casing and removed from the locking hole by a bias force from the biasing member, so as to allow the rotation of the intermediate gear 28, whereby the locking mechanism 5 enters the unlocking state.

Figure 4:
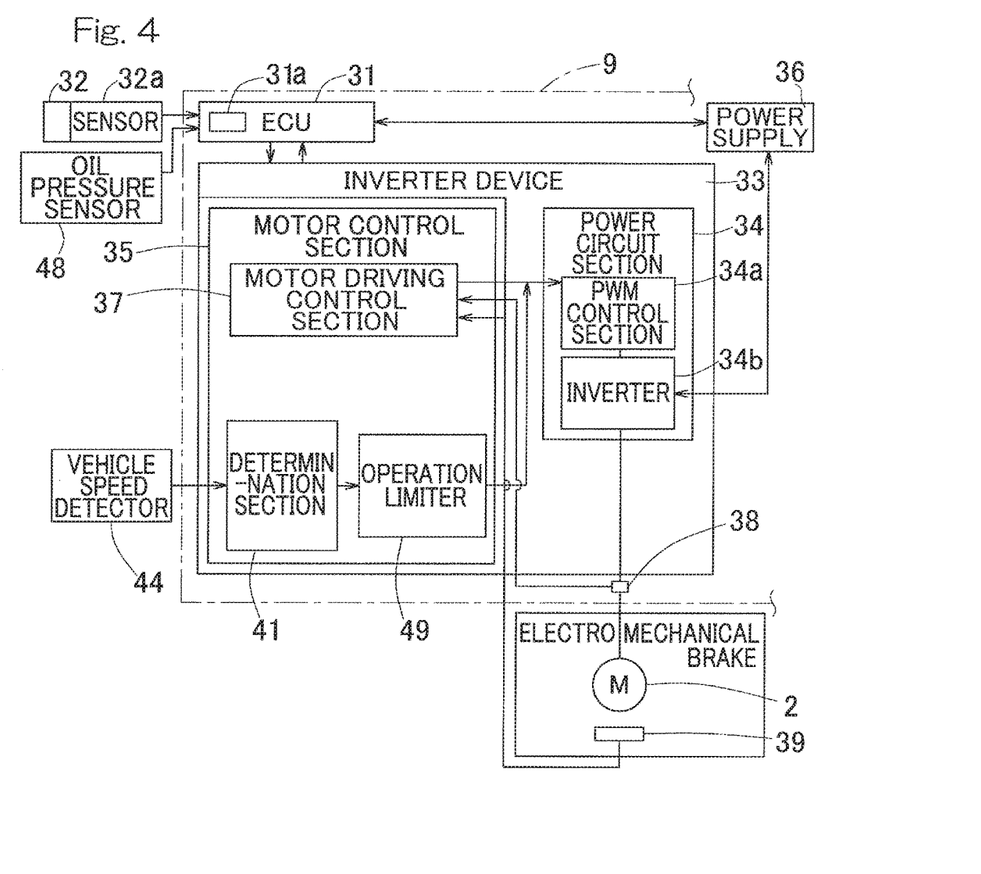
FIG. 4 is a block diagram of a control system of the electromechanical brake device.

FIG. 4 is a block diagram of a control system of the electromechanical brake device in the vehicular brake system. The ECU 31 has a brake operation input detector 31a, and the brake operation input detector 31a detects an input of a brake operation performed by a driver. For example, the brake operation input detector 31a detects an output, from a sensor 32a, which is changed according to an amount of operation of the brake pedal 32, or an output from the oil pressure sensor 48, described above, for detecting oil pressure based on an operation of the brake pedal 32. The ECU 31 generates a speed reduction command according to the output from the sensor 32a or the oil pressure sensor 48. The inverter device 33 is connected to the ECU 31, and the inverter device 33 includes: a power circuit section 34 provided for each electric motor 2; and a motor control section 35 that controls the power circuit section 34.

The motor control section 35 converts, according to a speed reduction command provided from the ECU 31, the speed reduction command into a current command, and provides the current command to a PWM control section 34a of the power circuit section 34. The power circuit section 34 has: an inverter 34b that converts DC power from a power supply 36 into three-phase AC power used for driving the electric motor 2; and the PWM control section 34a that controls the inverter 34b. The electric motor 2 is composed of a three-phase synchronous motor or the like. The inverter 34b is composed of a plurality of semiconductor switching elements (not shown), and the PWM control section 34a performs a pulse width modulation (PWM) of the inputted current command to provide an on/off command to each semiconductor switching element.

The motor control section 35 includes a computer, a program executed by the computer, and an electronic circuit, and has a motor driving control section 37 as its basic control section. The motor driving control section 37 converts, according to a torque command provided by the ECU 31, the command into the current command, and provides the current command to the PWM control section 34a of the power circuit section 34. The motor driving control section 37 obtains, from a current detector 38, a value of a motor current that flows from the inverter 34b to the electric motor 2, thereby to perform a current feedback control. Further, the motor driving control section 37 obtains a rotation angle of a rotor of the electric motor 2 from a rotation angle sensor 39, and provides the current command to the PWM control section 34a so as to enable efficient motor driving according to the rotor rotation angle.

In the present embodiment, the motor control section 35 includes a determination section 41 and an operation limiter 49 as described below. The determination section 41 determines whether or not a vehicle speed detected by a vehicle speed detector 44 is less than or equal to a predetermined vehicle speed (for example, less than or equal to 20 km/h). When the determination section 41 determines that the vehicle speed is less than or equal to the predetermined vehicle speed, the operation limiter 49 reduces or halts an output from the electric motor 2 even when the brake operation input detector 31a detects an input of the brake operation. As the vehicle speed detector 44, for example, a rotation angle sensor (rotation sensor) for detecting rotation of a wheel is used.

A limitation is imparted, by the operation limiter 49, to the current command provided from the motor driving control section 37 to the PWM control section 34a, whereby the PWM control section 34a limits a PWM duty ratio of a conduction time in a motor coil (not shown) of the motor 2. The PWM duty ratio represents a ratio of an on-time (for example, a time in which the on-off command signal is asserted) to a switching cycle time of a pulse wave. Therefore, in a case where the vehicle speed is less than or equal to the predetermined vehicle speed, even when the brake operation is inputted, the PWM duty ratio that is proportional to a braking force of the electromechanical brake is limited, whereby the operation of the electric motor 2 is limited or halted. In this case, a braking force due to a working fluid pressure is applied to the left and right front wheels 45, 45 or the front wheel set by the hydraulic brake devices A1 (FIG. 1), whereby the vehicle is braked.

Figure 5:
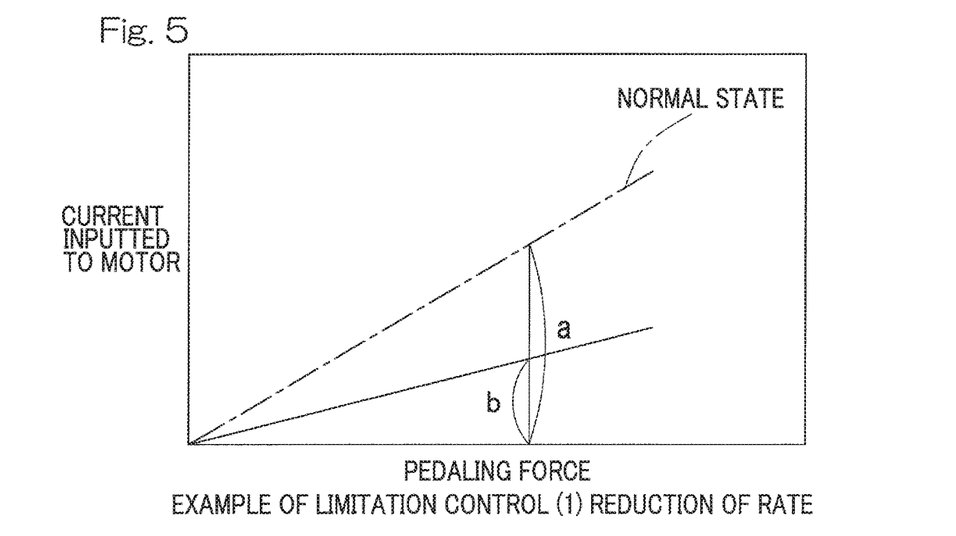
FIG. 5 illustrates a relationship between a pedaling force and a current inputted to a motor.

FIG. 5 illustrates a relationship between a pedaling force and the current inputted to the motor. Hereinafter, description will be made also with reference where appropriate to FIG. 4. In a normal state where the determination section 41 determines that the vehicle speed is higher than the predetermined vehicle speed, the greater an amount of operation of the brake pedal 32 is, that is, the higher the pedaling force is, the higher the current inputted to the electric motor 2 is, as indicated by a single dotted line in FIG. 5. Thus, for example, an operation of the electric motor 2 is not limited. In this case, both a braking force by the electromechanical brake device and a braking force by the hydraulic brake device fully act.

When the determination section 41 determines that the vehicle speed is less than or equal to the predetermined vehicle speed, the higher the pedaling force is, the higher the current inputted to the motor is, as indicated by a solid line in FIG. 5. However, an inclination of the current inputted to the motor, which is plotted against the pedaling force appears lower than that of the normal state, and the operation of the electric motor 2 is limited at a predetermined rate. That is, the operation limiter 49 reduces a motor output from the electric motor 2 by multiplying the input of the brake operation detected by the brake operation input detector 31a by a predetermined ratio (for example, a value b/a using a and b in the figure).

Figure 6:
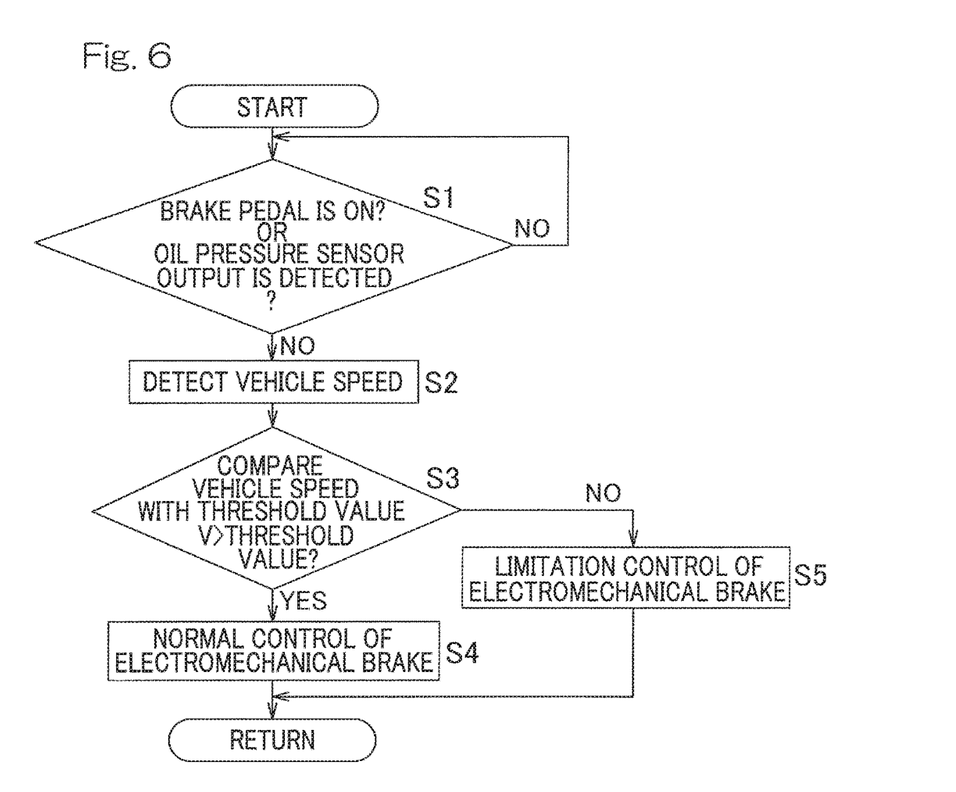
FIG. 6 is a flow chart showing stepwise a control operation for the electromechanical brake device.

FIG. 6 is a flow chart showing stepwise a control operation for the electromechanical brake device. After starting of the process of the present embodiment (start), the brake operation input detector 31a detects, in step S1, whether or not an output from the oil pressure sensor 48 or an output, from the sensor 32*a*, which is changed according to or in response to an amount of operation of the brake pedal 32, is obtained. When neither of the sensor outputs is detected (step S1: NO), the process of this control operation is returned to step S1.

When the sensor output is detected (step S1: YES), the vehicle speed detector 44 detects the vehicle speed (step S2). Next, the determination section 41 compares the detected vehicle speed with a threshold value (step S3). When the detected vehicle speed V is determined as being higher than the predetermined vehicle speed (threshold value) (step S3: YES), a control for the electromechanical brake in the normal state is performed (step S4), and the process is returned. When, in step S3, the vehicle speed V is determined as being less than or equal to the threshold value (step S3: NO), the control for limiting the operation of the electric motor 2, according to the present embodiment as described above, is performed by the operation limiter 49 (step S5). Thereafter, the process is returned.

An operation and an advantageous effects will be described. In a case where the determination section 41 determines that the vehicle speed V is less than or equal to the predetermined vehicle speed, even when the input of the brake operation is detected by the brake operation input detector 31*a*, the operation limiter 49 limits the operation of the electric motor 2. When the vehicle speed is less than or equal to the predetermined vehicle speed, the operation limiter 49 limits an operation of the electromechanical brake device A2 as compared with a case where the vehicle speed is higher than the predetermined vehicle speed. Therefore, an operating noise caused by a backlash of the speed reduction mechanism 3 can be reduced.

In this case, the vehicle is braked mainly by a braking force by a working fluid pressure being applied to the left and right front wheels 45, 45 by the hydraulic brake devices A1, A1, respectively, because the braking force for the vehicle that runs slowly at a reduced speed or is halted can be sufficiently assured by the left and right front wheels 45, 45 only. Thus, in a vehicle in which both the hydraulic brake device A1 and the electromechanical brake device A2 are used, when the vehicle runs at a low speed or is halted and thus an operating noise of the electromechanical brake device A2 becomes more noticeable as compared with when the vehicle speed is higher than the predetermined vehicle speed, an operation itself is limited, whereby the operating noise can be reduced with little influence on a braking force of the brake.

When the vehicle speed is less than or equal to the predetermined vehicle speed, the operation limiter 49 reduces the motor output from the electric motor 2 at a predetermined rate according to the input of the brake operation detected by the brake operation input detector 31*a*. In this case, a ratio between the braking force by the hydraulic brake device A1 and the braking force by the electromechanical brake device A2 can be finely adjusted according to the brake operation. Therefore, a driver can be prevented from feeling uncomfortable about an operation when the driver operates the brake.

Other embodiments will be described. In the following description, the components corresponding to the matters described in the preceding embodiment are denoted by like reference numerals, and repeated description is not given. When only a part of a configuration is described, the other part of the configuration is the same as described in the preceding description unless otherwise specified. The same operation and effect can be obtained from the same configuration. A combination of parts that are specifically described in the embodiments can be implemented, and, further, the embodiments may be partially combined unless such combinations cause any problem.

Figure 7:
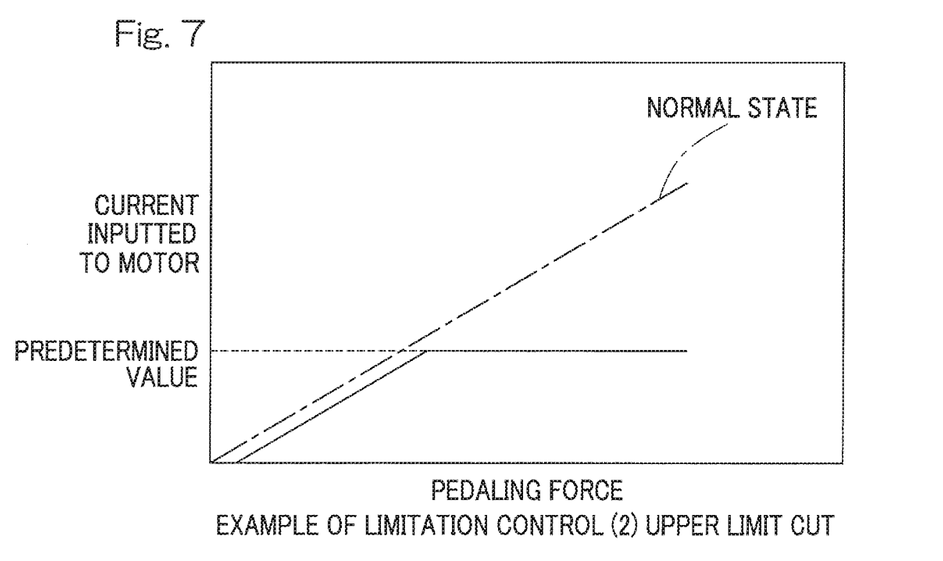
FIG. 7 illustrates a relationship between a current inputted to a motor and a pedaling force for a vehicular brake system according to another embodiment of the present invention.

As shown in FIG. 7, in the case where the determination section 41 determines that the vehicle speed is lower than or equal to the predetermined vehicle speed, even when the input of the brake operation is detected by the brake operation input detector 31*a*, that is, even when the pedaling force is increased, the operation limiter 49 may limit the motor output of the electric motor 2 (current inputted to the motor) during the increase of the pedaling force such that the motor output is not made greater than a predetermined value. In a case where the upper limit of the current inputted to the motor, with respect to the pedaling force, is cut as mentioned above, an operating noise of the electromechanical brake device A2 can be more assuredly reduced than in the case of the previous embodiment, when the vehicle runs slowly at a reduced speed or is halted (or at stoppage).

Figure 8:
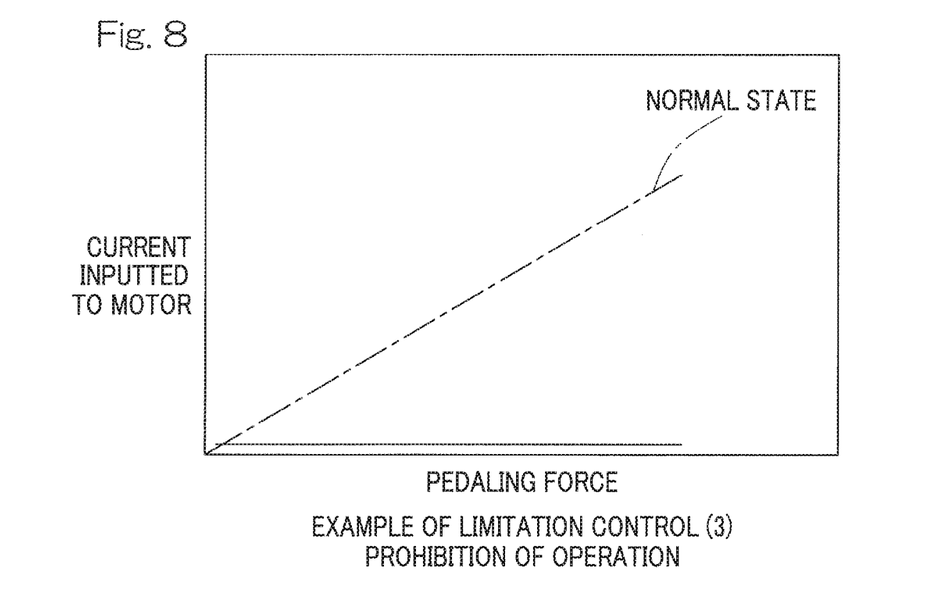
FIG. 8 illustrates a relationship between a current inputted to a motor and a pedaling force for a vehicular brake system according to still another embodiment of the present invention.

As shown in FIG. 8, in the case where the determination section 41 determines that the vehicle speed is less than or equal to the predetermined vehicle speed, even when an input of a brake operation is detected by the brake operation input detector 31*a*, that is, even when the pedaling force is increased, the operation limiter 49 may make the motor output of the electric motor 2 (current inputted to the motor) "zero". In this case, when the vehicle runs slowly at a reduced speed or is halted, an operating noise of the electromechanical brake device A2 can be still more assuredly reduced. In addition, the left and right front wheels 45, 45 can be braked only by the hydraulic brake devices A1, A1, and, further, a load for calculation process of the control device 9 can be reduced.

The hydraulic brake device A1 may operate so as to increase a braking force by an amount corresponding to a limited or reduced amount of braking force of the electromechanical brake device A2. Thus, even when the electromechanical brake device A2 is regulated, an operation of the hydraulic brake device A1 is enhanced by the amount corresponding to the limited amount, whereby the braking force can be maintained in total. The electromechanical brake devices A2, A2 may be used for the left and right front wheels 45, 45 or the front wheel set, and the hydraulic brake devices A1, A1 may be used for the left and right rear wheels 43, 43 or the rear wheel set.

As the vehicle speed detector 44, for example, a rotation sensor for detecting a rotation of a rotary mechanism (for example, a differential gear or hub bearing) including a motor that cooperates with the wheels and any rotatable unit disposed between the motor and the wheels, may be used. As the vehicle speed detector 44, an acceleration sensor may be used, and the vehicle speed may be obtained by an acceleration detected by the acceleration sensor being integrated. Further, as the vehicle speed detector 44, a global positioning system (GPS) sensor may be used, and the vehicle speed may be calculated according to a change in time and position of the vehicle obtained by the sensor.

Although the present invention has been fully described in connection with the preferred embodiments thereof with reference to the accompanying drawings, those skilled in the art will readily would conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included within the scope.

REFERENCE NUMERALS

2 . . . electric motor
3 . . . speed reduction mechanism
4 . . . linear motion mechanism
9 . . . control device
31a . . . brake operation input detector
39 . . . rotation angle sensor
41 . . . determination section
42 . . . braking force application mechanism
43 . . . rear wheel
45 . . . front wheel
49 . . . operation limiter
A1 . . . hydraulic brake device
A2 . . . electromechanical brake device

What is claimed is:

1. A vehicular brake system comprising:
a hydraulic brake device used for left and right wheels of one of front and rear wheel sets and being configured to apply a braking force by a working fluid pressure to the left and right wheels of the one of the wheel sets, according to a brake operation;
an electromechanical brake device used for left and right wheels of the other of the wheel sets and being configured to apply a braking force by an electric power to the left and right wheels of the other of the wheel sets, according to the brake operation; and
a brake operation input detector configured to detect an input of the brake operation from a driver,
wherein the electromechanical brake device includes
an electric motor;
a braking force application mechanism configured to apply, to the wheels, the braking force having a value based on an output from the electric motor, and
a control device configured to control the electric motor,
the control device includes
a determination section configured to determine whether or not a vehicle speed detected by a vehicle speed detector is less than or equal to a predetermined vehicle speed; and
an operation limiter configured to halt an output from the electric motor even when the brake operation input detector detects the input of the brake operation, in a case where the determination section determines that the vehicle speed is less than or equal to the predetermined vehicle speed, and
the hydraulic brake device operates so as to enhance a braking force by an amount corresponding to a reduced amount of a braking force by the electromechanical brake device.

2. The vehicular brake system as claimed in claim 1, wherein the braking force application mechanism includes:
a speed reduction mechanism configured to reduce a speed of rotation of the electric motor; and
a linear motion mechanism configured to convert, into a linear motion, a rotary motion outputted from the speed reduction mechanism.

3. The vehicular brake system as claimed in claim 1, wherein the vehicle speed detector is a sensor that includes at least one of a rotation sensor, an acceleration sensor and a global positioning system sensor, the rotation sensor being configured to detect a rotation of the wheel or a rotation of a rotary mechanism including a motor that cooperates with the wheels and any rotatable unit disposed between the motor and the wheels.

4. The vehicular brake system as claimed in claim 1, wherein, when the determination section determines that the vehicle speed is less than or equal to the predetermined vehicle speed, the operation limiter reduces a current to be inputted to the electric motor at a predetermined rate as compared with a current inputted to the electric motor in a normal state, with respect to the input of the brake operation detected by the brake operation input detector.

5. The vehicular brake system as claimed in claim 1, wherein, when the determination section determines that the vehicle speed is less than or equal to the predetermined vehicle speed, the operation limiter sets a motor output from the electric motor to be zero.

6. The vehicular brake system as claimed in claim 1, wherein, when the determination section determines that the vehicle speed is less than or equal to the predetermined vehicle speed, the operation limiter limits a motor output from the electric motor such that the motor output does not exceed a predetermined value.

* * * * *

UNITED STATES PATENT AND TRADEMARK OFFICE
CERTIFICATE OF CORRECTION

PATENT NO.       : 9,994,204 B2
APPLICATION NO.  : 15/188044
DATED            : June 12, 2018
INVENTOR(S)      : Makoto Yasui Page 1 of 1

It is certified that error appears in the above-identified patent and that said Letters Patent is hereby corrected as shown below:

In the Claims

Column 11, Line 34:
In Claim 1, delete "motor," and insert -- motor; -- therefore.

Signed and Sealed this
Thirty-first Day of July, 2018

Andrei Iancu
*Director of the United States Patent and Trademark Office*